United States Patent [19]

Nishino et al.

[11] Patent Number: 4,493,900
[45] Date of Patent: Jan. 15, 1985

[54] LOW MELTING ENAMEL FRITS

[75] Inventors: Atsushi Nishino, Neyagawa; Masaki Ikeda; Kunio Kimura, both of Hirakata; Hajime Oyabu, Kawanishi, all of Japan

[73] Assignee: Matsushita Electric Industrial Company, Limited, Japan

[21] Appl. No.: 463,937

[22] Filed: Feb. 4, 1983

[30] Foreign Application Priority Data

Feb. 8, 1982 [JP] Japan .................................. 57-19243

[51] Int. Cl.³ ............................ C03C 7/02; C03C 7/06
[52] U.S. Cl. ........................................ 501/26; 501/25; 501/79
[58] Field of Search ..................... 501/25, 26, 79, 78, 501/58, 59

[56] References Cited

U.S. PATENT DOCUMENTS

| 3,396,044 | 8/1968 | Satterfield | 501/25 |
| 4,312,951 | 1/1982 | Eppler | 501/77 |
| 4,315,778 | 2/1982 | Ueno et al. | 501/73 |
| 4,361,654 | 11/1982 | Ohmura et al. | 501/26 |

Primary Examiner—Howard S. Williams
Assistant Examiner—T. L. Williams
Attorney, Agent, or Firm—Lowe, King, Price & Becker

[57] ABSTRACT

A low melting enamel frit which comprises 31 to 39 wt % of $SiO_2$, 13 to 21 wt % of $B_2O_3$, 14 to 21 wt % of $Na_2O$, 1 to 5 wt % of $K_2O$, 5 to 20 wt % of ZnO, 2 to 10 wt % of $F_2$ and 2 to 9 wt % of at least one of $Al_2O_3$, $ZrO_2$ and $TiO_2$ provided that at least one intermediate oxide is present in an amount of 5 wt % in a maximum. The frit is capable of firing at temperatures lower than $A_1$ transformation temperature of steel, say, 723° C.

9 Claims, 2 Drawing Figures

LOW MELTING ENAMEL FRITS

BACKGROUND OF THE INVENTION

1. Field of the Invention

This invention relates to the enamel art and more particularly, to transparent low melting enamel frits which are free of lead and phosphorus components.

2. Description of the Prior Art

In general, the firing temperature of iron enamels ranges from 800° to 870° C. which is higher than $A_1$ transformation point (723° C.), so that on firing, the crystal form of iron transforms from alpha to gamma iron. By the transformation, the iron sheet or plate is apt to warp or deform due to thermal stresses involved and deteriorates in dimensional accuracy after firing with an increase of fraction defective. Accordingly, the sheet thickness has to be increased. Moreover, when iron sheets are heated at high temperatures, evolution of hydrogen and the like gases adsorbed or occuluded in the sheets takes place considerably. Moisture or water in slip or on iron plate readily reacts, in the range of firing temperatures, with carbon contained in iron sheet thereby evolving carbon dioxide, with the tendency that defects such as bubbles, pineholes and the like are formed in the enamel surface.

Where, for instance, an iron enamel is baked on an inner wall of an molded oven made of a 0.6 mm thick sheet steel at a temperature of 800° to 870° C., the molded article deforms considerably and a good number of bubbles and pineholes are produced, thus the fraction defective increasing. On the other hand, if firing of enamels is possible at temperatures lower than $A_1$ transformation point, deformation caused by thermal stresses will be lessened with a reduction of defects such as bubbles and pineholes resulting from evolution of gases. This permits use of thin sheets of about 0.4 mm in thickness and makes it possible to apply enamels onto articles of more complicate shapes.

In recent years, great attention has been paid to savings of resources and energies. By lowering firing temperatures of enamel, fuel cost can be reduced. Additionally, use of thinner metal sheets is very advantageous in saving the cost of base metals.

In view of these circumstances, studies have been made in an attempt to produce low melting enamels comprising PbO or $P_2O_5$ in Japan and abroad. However, these enamels are still unsatisfactory with respect to environmental contamination, safety against human bodies and cost and thus have not yet taken the place of currently employed enamels which are fired at high temperatures.

Furthermore, enamels are usually needed to have not only the function of protecting the surface of base material, e.g. resistances to heat and corrosion, but also the decorative function. However, conventional low melting lead frits could not satisfy both the functions.

Properties or characteristics as required for the decorative purposes include, for example, aside from smoothness and gloss of enamel surface, color developability and color stability. Conventional low melting enamel frits presented problems in color developability and stability.

In order to impart bright color to enamel layer or surface, two methods are usually used including a method in which colorants (metal oxides) are incorporated in molten frit along with other materials and a method in which pigments are added to transparent or clear frit (called transparent glaze) as a mill additive. The latter method is more advantageous in that color control is easier, usable pigments are larger in number, and brighter color can be formed. Another advantage is that this method is better in economy because only one frit suffices for forming enamel layers of different colors. Pigments added to transparent glaze in the latter method are ordinarily prepared by mixing various coloring metals or oxides thereof with clay or alumina, calcining the mixture at suitable temperatures, grinding it to pieces and washing with water. Pigments used as a mill additive are generally used in an amount of about 1–10 wt% of frit. Conventional borosilicate clear frits which are fired at high temperatures of 800° to 850° C. are commercially available. In order to obtain enamel layers of different colors using borosilicate frits, it is essential to apply two slips for forming one ground coat enamel and one cover coat enamel does not ensure satisfactory adhesion strength and results in poor appearance because bubbles and pineholes are produced by reaction with base metal.

Occurrence of bubbles, pinholes and the like is mainly attributed to evolution of hydrogen gas by reaction of water from slip and steam in furnace with base steel. This reaction can be expressed by the following formula (1).

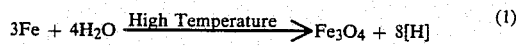

$$3Fe + 4H_2O \xrightarrow{\text{High Temperature}} Fe_3O_4 + 8[H] \quad (1)$$

For one cover coat enamel, the reaction of the above formula occur vigorously at very high firing temperatures of 800° to 850° C., so that bubbles, pineholes and the like are formed in the surface of enamel in large amounts and thus the appearance becomes poor. In order to avoid this, ground coat enamel is formed so that the reaction with base steel is suppressed and adhesion to base metal is improved.

A so-called two-coat enamel which is obtained by application of conventional ground coat and cover coat enamels of the high temperature firing type is high in production cost because a number of processing steps are necessary. A large proportion of the cost is occupied by the application and firing costs and the cost of frit. Additionally, great thermal stresses are produced by the firing under high temperature conditions as described before, thus lowering the yield of the process. As a whole, the production cost becomes high in case of the conventional two-coat enamel.

On the other hand, low melting enamel frits have a number of merits that strains caused by firing are reduced because lower firing temperatures are used and the reaction of the afore-indicated formula hardly occurs with bubbles and pineholes in the enamel surface being produced only in a small degree. In addition, only one coat enamel is sufficient for application of low melting enamel frits. For transparent glazes such as for lead frit which is one of conventional low melting frits, it is easy to impart various colors such as pink, green, blue, brown, black and the like by adding, to the glaze, pigments comprising relatively stable coloring metal oxides. However, such glazes show poorer compatibility with pigments based on cadmium sulfide and cadmium selenide which are chemically and thermally unstable. Accordingly, it was very difficult to impart red, yellow, orange and the like colors to the glazes. The reason for this is due to the fact that the sulfur or selenium component in the pigment readily reacts with lead in lead frits to form black lead sulfide, rendering the enamel surface black. That is, the conventional lower melting lead frits could not be imparted with all colors thereto or could not be stabilized in color tone.

SUMMARY OF THE INVENTION

It is accordingly an object of the present invention to provide low melting borosilicate frits which are free of lead and phosphorus and are thus harmless against human body without involving ecological problems.

It is another object of the invention to provide low melting frits which can be fired at temperatures lower than $A_1$ transformation point (723° C.) of iron or its alloys and can be colored covering all the kinds of colors.

It is a further object of the invention to provide low melting frits which are applicable not only to ordinary enameling iron, but also to aluminized steels, stainless steels and cast iron.

The low melting frit according to the invention comprises 31 to 39 wt% of $SiO_2$, 13 to 21 wt% of $B_2O_3$, 14 to 22 wt% of $Na_2O$, 1 to 5 wt% of $K_2O$, 13 to 20 wt% of ZnO, 2 to 10 wt% of $F_2$, and 2 to 9 wt% of at least one intermediate oxide selected from the group consisting of $Al_2O_3$, $ZrO_2$ and $TiO_2$, the individual intermediate oxides not exceeding 5 wt% at the highest. The low melting frit should satisfy the following relations in which ratios are by weight:

$SiO_2/B_2O_3 = 1.5$ to 3.0:1;
$ZnO + Al_2O_3 + TiO_2 + ZrO_2 = 17$ to 25 wt%;
$ZnO/(ZnO + Al_2O_3 + TiO_2 + ZrO_2) = 0.65$ to 0.90:1;
$Na_2O + K_2O = 16$ to 23 wt%;
$(ZnO + Al_2O_3 + TiO_2 + ZrO_2)/(Na_2O + K_2O) = 0.85$ to 1.2:1; and
$(SiO_2 + B_2O_3 + F_2)/(Na_2O + K_2O + ZnO) = 1.3-2.0:1$.

Figure 1:
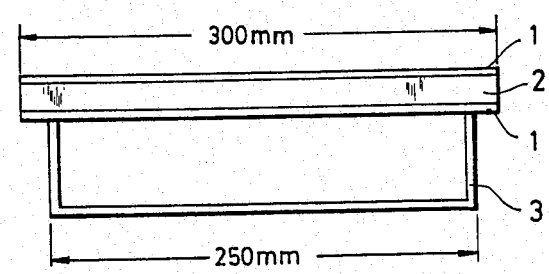
FIG. 1 is a schematic view illustrating the measurement of thermal strain caused by firing.

DETAILED DESCRIPTION AND PREFERRED EMBODIMENTS OF THE INVENTION (1) Thermal Expansion Coefficients of Frits Typical of base metals to be enameled are iron, stainless steels, aluminized steels, aluminium and the like. The thermal expansion coefficients of these metals determined within a temperature range of 0° to 100° C. are indicated in Table 1 below.

TABLE 1

| Metal | Thermal Expansion Coefficient ($deg^{-1} \times 10^{-7}$) |
| --- | --- |
| Iron | 123 |
| Ferrite Stainless Steel | 110–125 |
| Austenite Stainless Steel | 170–190 |
| Aluminized Steel | 124 |
| Cast Iron | 100–140 |
| Copper | 168 |
| Aluminium | 236 |

The thermal expansion coefficient of frit should be controlled to match with that of an intended base metal. In general, the thermal expansion coefficient, is experientially calculated from the following equation for convenience sake.

$$\alpha = \sum_{n}^{n} a_n P_n \qquad (2)$$

in which a is a thermal expansion coefficient factor of each oxide component in frit and P is a weight percent of each component.

In Table 2, there are indicated thermal expansion coefficient factors of typical oxides.

TABLE 2

| Frit Components | Factor of Thermal Expansion Coefficient ($\times 10^{-7}$) | Frit Components | Factor of Thermal Expansion Coefficient ($\times 10^{-7}$) |
| --- | --- | --- | --- |
| $SiO_2$ | 0.27 | CaO | 1.67 |
| $B_2O_3$ | 0.03 | MgO | 0.03 |
| $Na_2O$ | 3.33 | ZnO | 0.70 |
| $K_2O$ | 2.83 | $TiO_2$ | 0.77 |
| $Li_2O$ | 0.67 | $Al_2O_3$ | 0.27 |
| BaO | 1.00 | $ZrO_2$ | 0.70 |

A frit composition should be determined to have a suitable expansion coefficient calculated according to the equation (2), which may vary depending on the type of base metal to be applied. For instance, where sheet steels are used as a base metal for application of ordinary enamels, a frit selected must have an expansion coefficient ranging from 85 to $105 \times 10^{-7}$ $deg^{-1}$. If the coefficient is below $85 \times 10^{-7}$ $deg^{-1}$, the enamel surface will be broken or the base metal will be deformed as protuberant. In addition, the enamel layer is removed so that the base metal is exposed. On the other hand, expansion coefficients larger than $105 \times 10^{-7}$ $deg^{-1}$ result in deforming the base metal as recessed and chipping the enamel layer upon cooling thereof after firing. In the case of frits which are fired at temperatures lower than $A_1$ transformation point of iron, it was found that an optimum expansion coefficient was in the range of 85 to $115 \times 10^{-7}$ $deg^{-1}$ which was slightly greater than an optimum range of expansion coefficient of 85 to $105 \times 10^{-7}$ $deg^{-1}$ for currently employed iron frits. This is considered due to the fact that the firing temperature is lower by about 100° to 200° C. than ordinary firing temperatures, and thus thermal stresses exerted on base metal are so small that a wider range of expansion coefficient can be used.

As will be appreciated from the above, the expansion coefficient of a frit being used will vary depending on the type of base metal and the firing temperature.

(2) Softening Point of Frit

In order to fire an enamel at low temperatures, it is necessary to lower a softening point of frit so that the frit is softened and flows at firing temperatures, thus wetting the steel surface therewith. For instance, in order to form an enamel at low temperatures below $A_1$ transformation point (723° C.) of steel, the firing temperature should be below 720° C. With aluminized steels or aluminium-clad steels, an Al-Fe alloy layer grows considerably between the aluminium layer and the iron layer when placed under conditions of over 600° C. The growth of the Al-Fe alloy layer results in lowering the adherence between the enamel and the base metal. Thus, the firing temperature should be below 600° C. When aluminium is used as a base metal, the firing temperature should be in the range below 600° C. This is because the melting point of aluminium is 658°

C. and the base metal is not caused to thermally deform at temperatures below 600° C. The softening point of frit is thus determined according to the type of base metal as well.

(3) Coloration with Pigments

By addition of pigments comprising relatively stable coloring metal oxides to transparent glazes, there can readily be obtained glazes having colors such as pink, green, blue, brown, black and the like. Typical examples of these pigments are tabulated below.

TABLE 3

| Red | (%) | Pink | (%) | Green | (%) |
|---|---|---|---|---|---|
| Cadmium sulfide | 65.4 | Silica | 18 | Silica | 35 |
| Cadmium oxide | 17.3 | Borax | 4 | Niter | 1 |
| Selenium | 17.3 | Precipitated calcium carbonate | 30 | Limestone | 3.5 |
| | | Tin oxide | 45 | Lead carbonate | 3.5 |
| | | Potassium bicarbonate | 3 | Chromium oxide | 50 |
| | | | | Potassium bicarbonate | 7 |
| Calcining Temperature (°C.) | 590 | | 1,200–1,300 | | 1,180 |

| Blue | (%) | Brown | (%) | Black | (%) |
|---|---|---|---|---|---|
| Zinc flower | 38 | Potassium bicarbonate | 34 | Cobalt oxide | 16 |
| Cobalt oxide | 55 | Iron oxide | 18.5 | Manganese dioxide | 52 |
| Cobalt chromate | 7 | Alumina | 47.5 | Chromium oxide | 16 |
| | | | | Iron oxide | 16 |
| Calcining Temperature (°C.) | 1,250 | | 1,250 | | 1,180 |

On the other hand, pigments comprising cadmium sulfide or cadmium selenide readily react with glass components to form cadmium oxide or other sulfides which are black in color. Thus, color development of enamel in red, orange, yellow and the like becomes difficult as mentioned hereinbefore. Typical compositions of CdS pigments are shown in Table 4.

TABLE 4

| | Color | | | |
|---|---|---|---|---|
| Component | No. 1 Bright Red | No. 2 Neutral Red | No. 3 Dark Red | No. 4 Reddish Yellow |
| Cadmium sulfide | 65.4 | 72.0 | 57.5 | 64.6 |
| Cadmium oxide | 17.3 | 8 | 23.1 | 23.5 |
| Selenium | 17.3 | 20.0 | 19.2 | 11.9 |
| Calcining Temp. (°C.) | 590 | 500 | 500 | 550 |

As will be seen from the above, the composition of pigment components varies according to an intended color. We have found that in order that enamel layers of red, orange, yellow and the like colors are obtained using cadmium sulfide and selenium which are chemically and thermally unstable, the following requirements must be satisfied.

(a) Chemical reactions between the main component of pigment and frit components must not occur during firing.

(b) Frit particles melt about pigment particles to coat the pigment particles therewith.

(c) Frits must have a softening point below 600° C.

The above requirements are more particularly described.

(a) Glass components which readily react with pigments comprising cadmium sulfide as their main component include PbO. Cadmium sulfide and PbO react with each other to form black PbS, the resulting enamel layer becoming black. Aside from PbO, alkaline components present in excess in frit such as $Na_2O$, $K_2O$, $Li_2O$ and the like serve to blacken the enamel layer. Accordingly, frits suitable for the purpose of the invention must be free of PbO, and the alkaline components including $Na_2O$, $K_2O$ and $Li_2O$ which are necessary for lowering the melting point of frit must be prevented from eluting in excess.

(b) If pigment particles are not coated with frit particles, the pigment particles undergo thermal oxidation upon firing and Cd component in the pigment particles is converted into CdO. Thus, the resulting enamel layer becomes black in color. To avoid this, pigment particles must be covered with frit particles so that the pigment particles do not undergo thermal oxidation during firing.

Satisfactory coating of pigment particles with frit particles is greatly influenced by the ratio of pigment particles to frit particles and the size of frit particles in slip. Our experiments reveal that satisfactory results are obtained when pigments particles are used in an amount of 1 to 7 parts by weight per 100 parts by weight of frit. Larger amounts of pigment particles result in incomplete coating of pigment particles with frit particles, thus making a black enamel layer. With smaller amounts, the effect of pigments cannot be expected.

Moreover, the size of frit particles in slip should preferably be determined as follows: 50 cc of a slip having a solid content of about 60 to 70% by weight is sampled, placed on a 250 mesh standard screen and washed with an excess of water to obtain a residue. The residue on the dry basis should be below 5 g. If the residue is over 5 g, pigment particles may not be completely covered with frit particles, thus undergoing thermal oxidation upon firing.

(c) Before pigment particles undergo thermal oxidation and are converted into CdO which is black in color, frit particles should melt to cover the pigment particles therewith so that the pigment particles are not exposed to the atmospheric air. In other words, before pigment particles reach a temperature at which cadmium component in the particles is converted into CdO, frit particles must be softened. The temperature at which cadmium sulfide pigment is converted into CdO is about 600° C. Accordingly, the softening temperature of frit particles should be below 600° C.

As discussed above, coloration of enamel with pigments and particularly with cadmium sulfide pigments has intimate relation with the composition of frit, physical properties including softening point and chemical properties including elution of alkaline components as well as the amount of pigment and the size of frit.

The frit composition which is the main factor for the coloration and to which the present invention is directed is described.

(4) Frits should have proper thermal expansion coefficients and softening points. Particularly from the viewpoint of color stability, frits should have such a softening point and chemical stability as discussed before.

We investigated a great number of frit compositions indicated in Tables 5-1 and 5-2. The results of this investigation are shown in Table 6.

In Table 6, the softening point means a temperature measured at the time when a viscosity of glass is $10^{7.5}$ centipoises. The solubility in hot water was determined as follows: 5 g of a 200 to 350 mesh frit is immersed in 100 cc distilled water and boiled for 1 hours, after which a supernatant liquid was collected and dissolved alkaline components in the liquid were titrated with 0.1N $H_2SO_4$ using Methyl Orange indicator. The consumption of 0.1N $H_2SO_4$ was used as a measure of the dissolved alkaline components. The consumption of the sulfuric acid below 0.1 ml is evaluated as "Good", a consumption ranging from 1 to 3 ml is evaluated as "Moderate" and a consumption over 3 ml is evaluated as "Bad".

The thermal expansion coefficient is a value calculated from the afore-indicated equation (2) using expansion coefficient factors of the respective components indicated in Table 2.

The surface states and characteristics of each enamel layer were evaluated as follows.

A frit sample was milled and passed through a 200 mesh sieve. 100 parts by weight of the sample, 0.5 part by weight of borax, 0.25 part by weight of sodium nitrite, 5 parts by weight of the bright red pigment No. 1 in Table 4, and 45 parts by weight of water were charged into a ball mill and milled for 1 hour. The resulting mixture was applied onto a 0.6 mm thick nickel-treated enameling sheet steel by a spray gun and dried, followed by firing at 670° C. for 5 minutes to obtain a test sheet.

With respect to surface defects of enamel layer (orange peel, wave and pinhole), the enamel surface of each test sheet was visually observed on the respective defects. Indicated by the expression "Good" are no defects being observed and by the expression "Bad" are defects being observed.

Gloss is represented by light reflectivity which was determined by passing light on a test sheet at an incidental angle of 45°. Indicated by the expression "Good" is a reflectivity over 90, by the expression "Moderate" is a reflectivity ranging from 90 to 80, and by the expression "Bad" is a reflectivity below 80.

Adherence was determined as follow: a test sheet was placed on an oak plate and a steel ball was dropped at a distance of 2 m from the plate. A chipping area on enamel surface was evaluated as "Good" in the range below 3 mm$^2$, as "Moderate" in the range of 3 to 10 mm$^2$, and as "Bad" in the range over 10 mm$^2$.

The color difference was measured according to the following procedure. Tristimulus values, X, Y and Z, of a test sheet, represented by C.I.E. standard, were measured by a color-difference meter. Color difference, E, was calculated according to the following equation.

$$\Delta E = \sqrt{(X - a)^2 + (Y - b)^2 + (Z - c)^2}$$

in which a, b and c represent values of X, Y and Z of standard colors, respectively, but in this test, values of X, Y and Z of the bright red pigment No. 1 in Table 4 were used to determine a color difference, E, between pigment and enamel layer. The sensory degree of color difference can be summarized in Table 7.

TABLE 7

| Sensory Degree of Color Difference | N.B.S. Unit |
|---|---|
| Little color difference | 0–0.5 |
| Slight color difference | 0.5–1.5 |
| Moderate color difference | 1.5–3.0 |
| Considerable color difference | 3.0–6.0 |
| Very considerable color difference | 6.0–12.0 |

In Table 6, the color difference, E, was evaluated as "Good" in the range of 0–1.5, as "Moderate" in the range of 1.5–3.0 and as "Bad" in the range over 3.

It will be noted that in Table 6, the mark "—" in the columns of "Surface Defects" and "Characteristics" of enamel layer indicates that enamel layers whose expansion coefficient exceeds $115 \times 10^{-7}$ deg$^{-1}$ are locally chipped upon cooling after firing, thus the observation or measurement becoming impossible.

Finally, frit compositions which are considered, as a whole, to be useful in the practice of the present invention are evaluated as "Good", the other being evaluated as "Bad".

TABLE 5-1

| Test No. | Acidic Components (wt %) | | | Alkaline Components | | | | | | | Intermediate Oxide Components (wt %) | | |
|---|---|---|---|---|---|---|---|---|---|---|---|---|---|
| | | | | R20 | | | R'O | | | | | | |
| | SiO$_2$ | B$_2$O$_3$ | F$_2$ | Na$_2$O | K$_2$O | Li$_2$O | ZnO | CaO | MgO | BaO | Al$_2$O$_3$ | TiO$_2$ | ZrO$_2$ |
| 1 | 20 | 32 | 6 | 19 | 2 | | 16 | | | | 3 | | 2 |
| 2 | 26 | 26 | 6 | 19 | 2 | | 16 | | | | 3 | | 2 |
| 3 | 31 | 21 | 6 | 19 | 2 | | 16 | | | | 3 | | 2 |
| 4 | 35 | 17 | 6 | 19 | 2 | | 16 | | | | 3 | | 2 |
| 5 | 39 | 13 | 6 | 19 | 2 | | 16 | | | | 3 | | 2 |
| 6 | 42 | 10 | 6 | 19 | 2 | | 16 | | | | 3 | | 2 |
| 7 | 45 | 7 | 6 | 19 | 2 | | 16 | | | | 3 | | 2 |
| 8 | 39 | 19 | | 19 | 2 | | 16 | | | | 3 | | 2 |
| 9 | 38 | 18 | 2 | 19 | 2 | | 16 | | | | 3 | | 2 |
| 10 | 34 | 16 | 8 | 19 | 2 | | 16 | | | | 3 | | 2 |
| 11 | 33 | 15 | 10 | 19 | 2 | | 16 | | | | 3 | | 2 |

TABLE 5-1-continued

| Test No. | Acidic Components (wt %) | | | Alkaline Components | | | | | | | Intermediate Oxide Components (wt %) | | |
|---|---|---|---|---|---|---|---|---|---|---|---|---|---|
| | | | | R2O | | | R'O | | | | | | |
| | SiO2 | B2O3 | F2 | Na2O | K2O | Li2O | ZnO | CaO | MgO | BaO | Al2O3 | TiO2 | ZrO2 |
| 12 | 31 | 15 | 12 | 19 | 2 | | 16 | | | | 3 | | 2 |
| 13 | 40 | 19 | 6 | 14 | 0 | | 16 | | | | 3 | | 2 |
| 14 | 39 | 19 | 6 | 15 | 0 | | 16 | | | | 3 | | 2 |
| 15 | 38 | 18 | 6 | 17 | 0 | | 16 | | | | 3 | | 2 |
| 16 | 37 | 17 | 6 | 19 | 0 | | 16 | | | | 3 | | 2 |
| 17 | 35 | 16 | 6 | 22 | 0 | | 16 | | | | 3 | | 2 |
| 18 | 33 | 15 | 6 | 25 | 0 | | 16 | | | | 3 | | 2 |
| 19 | 32 | 15 | 6 | 26 | 0 | | 16 | | | | 3 | | 2 |
| 20 | 39 | 19 | 6 | 14 | 1 | | 16 | | | | 3 | | 2 |
| 21 | 39 | 18 | 6 | 15 | 1 | | 16 | | | | 3 | | 2 |
| 22 | 37 | 18 | 6 | 17 | 1 | | 16 | | | | 3 | | 2 |
| 23 | 36 | 17 | 6 | 19 | 1 | | 16 | | | | 3 | | 2 |
| 24 | 34 | 16 | 6 | 22 | 1 | | 16 | | | | 3 | | 2 |
| 25 | 32 | 15 | 6 | 25 | 1 | | 16 | | | | 3 | | 2 |
| 26 | 31 | 15 | 6 | 26 | 1 | | 16 | | | | 3 | | 2 |
| 27 | 39 | 18 | 6 | 14 | 2 | | 16 | | | | 3 | | 2 |
| 28 | 38 | 18 | 6 | 15 | 2 | | 16 | | | | 3 | | 2 |
| 29 | 37 | 17 | 6 | 17 | 2 | | 16 | | | | 3 | | 2 |
| 30 | 33 | 16 | 6 | 22 | 2 | | 16 | | | | 3 | | 2 |
| 31 | 31 | 15 | 6 | 25 | 2 | | 16 | | | | 3 | | 2 |
| 32 | 31 | 14 | 6 | 26 | 2 | | 16 | | | | 3 | | 2 |
| 33 | 37 | 17 | 6 | 14 | 5 | | 16 | | | | 3 | | 2 |
| 34 | 35 | 16 | 6 | 17 | 5 | | 16 | | | | 3 | | 2 |
| 35 | 31 | 15 | 6 | 22 | 5 | | 16 | | | | 3 | | 2 |
| 36 | 29 | 14 | 6 | 25 | 5 | | 16 | | | | 3 | | 2 |
| 37 | 36 | 17 | 6 | 14 | 6 | | 16 | | | | 3 | | 2 |
| 38 | 34 | 16 | 6 | 17 | 6 | | 16 | | | | 3 | | 2 |
| 39 | 31 | 14 | 6 | 22 | 6 | | 16 | | | | 3 | | 2 |
| 40 | 29 | 13 | 6 | 25 | 6 | | 16 | | | | 3 | | 2 |
| 41 | 41 | 19 | 6 | 19 | 2 | | 8 | | | | 3 | | 2 |
| 42 | 39 | 19 | 6 | 19 | 2 | | 10 | | | | 3 | | 2 |
| 43 | 37 | 18 | 6 | 19 | 2 | | 13 | | | | 3 | | 2 |
| 44 | 36 | 17 | 6 | 19 | 2 | | 15 | | | | 3 | | 2 |
| 45 | 34 | 16 | 6 | 19 | 2 | | 18 | | | | 3 | | 2 |
| 46 | 33 | 15 | 6 | 19 | 2 | | 20 | | | | 3 | | 2 |
| 47 | 31 | 14 | 6 | 19 | 2 | | 23 | | | | 3 | | 2 |
| 48 | 38 | 19 | 6 | 19 | 2 | | 16 | | | | 0 | | 0 |
| 49 | 38 | 18 | 6 | 19 | 2 | | 16 | | | | 1 | | 0 |
| 50 | 38 | 17 | 6 | 19 | 2 | | 16 | | | | 2 | | 0 |
| 51 | 37 | 17 | 6 | 19 | 2 | | 16 | | | | 3 | | 0 |
| 52 | 35 | 17 | 6 | 19 | 2 | | 16 | | | | 5 | | 0 |
| 53 | 34 | 16 | 6 | 19 | 2 | | 16 | | | | 7 | | 0 |
| 54 | 32 | 15 | 6 | 19 | 2 | | 16 | | | | 10 | | 0 |
| 55 | 38 | 18 | 6 | 19 | 2 | | 16 | | | | 0 | | 1 |
| 56 | 38 | 17 | 6 | 19 | 2 | | 16 | | | | 0 | | 2 |
| 57 | 37 | 17 | 6 | 19 | 2 | | 16 | | | | 0 | | 3 |
| 58 | 35 | 17 | 6 | 19 | 2 | | 16 | | | | 0 | | 5 |
| 59 | 34 | 16 | 6 | 19 | 2 | | 16 | | | | 0 | | 7 |
| 60 | 32 | 15 | 6 | 19 | 2 | | 16 | | | | 0 | | 10 |
| 61 | 38 | 18 | 6 | 19 | 2 | | 16 | | | | 0 | 1 | 0 |
| 62 | 38 | 17 | 6 | 19 | 2 | | 16 | | | | 0 | 2 | 0 |
| 63 | 37 | 17 | 6 | 19 | 2 | | 16 | | | | 0 | 3 | 0 |
| 64 | 35 | 17 | 6 | 19 | 2 | | 16 | | | | 0 | 5 | 0 |
| 65 | 34 | 16 | 6 | 19 | 2 | | 16 | | | | 0 | 7 | 0 |
| 66 | 32 | 15 | 6 | 19 | 2 | | 16 | | | | 0 | 10 | 0 |
| 67 | 36 | 17 | 6 | 19 | 2 | | 16 | | | | 2 | 0 | 2 |
| 68 | 35 | 16 | 6 | 19 | 2 | | 16 | | | | 2 | 0 | 4 |
| 69 | 35 | 16 | 6 | 19 | 2 | | 16 | | | | 2 | 2 | 2 |
| 70 | 36 | 17 | 6 | 19 | 2 | | 16 | | | | 3 | 0 | 1 |
| 71 | 33 | 16 | 6 | 19 | 2 | | 16 | | | | 3 | 0 | 5 |
| 72 | 33 | 15 | 6 | 19 | 2 | | 16 | | | | 3 | 3 | 3 |
| 73 | 35 | 17 | 6 | 19 | 2 | | 16 | | | | 4 | 0 | 1 |
| 74 | 33 | 16 | 6 | 19 | 2 | | 16 | | | | 4 | 1 | 3 |
| 75 | 32 | 15 | 6 | 19 | 2 | | 16 | | | | 4 | 2 | 4 |
| 76 | 31 | 15 | 6 | 19 | 2 | | 16 | | | | 4 | 3 | 4 |
| 77 | 31 | 14 | 6 | 19 | 2 | | 16 | | | | 4 | 3 | 5 |
| 78 | 31 | 15 | 6 | 19 | 2 | | 16 | | | | 5 | 1 | 5 |
| 79 | 31 | 14 | 6 | 19 | 2 | | 16 | | | | 5 | 2 | 5 |
| 80 | 30 | 14 | 6 | 19 | 2 | | 16 | | | | 5 | 3 | 5 |
| 81 | 34 | 17 | 6 | 19 | 2 | 1 | 16 | | | | 3 | | 2 |
| 82 | 33 | 16 | 6 | 19 | 2 | 3 | 16 | | | | 3 | | 2 |
| 83 | 32 | 16 | 6 | 19 | 2 | 4 | 16 | | | | 3 | | 2 |
| 84 | 34 | 17 | 6 | 19 | 2 | | 16 | 1 | | | 3 | | 2 |
| 85 | 33 | 16 | 6 | 19 | 2 | | 16 | 3 | | | 3 | | 2 |
| 86 | 32 | 16 | 6 | 19 | 2 | | 16 | 4 | | | 3 | | 2 |
| 87 | 34 | 17 | 6 | 19 | 2 | | 16 | | 1 | | 3 | | 2 |

TABLE 5-1-continued

| | Acidic Components (wt %) | | | Alkaline Components | | | | | | | Intermediate Oxide Components (wt %) | | |
|---|---|---|---|---|---|---|---|---|---|---|---|---|---|
| | | | | R2O | | | R'O | | | | | | |
| Test No. | SiO2 | B2O3 | F2 | Na2O | K2O | Li2O | ZnO | CaO | MgO | BaO | Al2O3 | TiO2 | ZrO2 |
| 88 | 33 | 16 | 6 | 19 | 2 | | 16 | | 3 | | 3 | | 2 |
| 89 | 32 | 16 | 6 | 19 | 2 | | 16 | | 4 | | 3 | | 2 |
| 90 | 34 | 17 | 6 | 19 | 2 | | 16 | | | 1 | 3 | | 2 |
| 91 | 33 | 16 | 6 | 19 | 2 | | 16 | | | 3 | 3 | | 2 |
| 92 | 32 | 16 | 6 | 19 | 2 | | 16 | | | 4 | 3 | | 2 |

TABLE 5-2

| Test No. | Total Content of SiO2 + B2O3 (wt %) | Total Content of Na2O + K2O (wt %) | Total Content of ZnO + Al2O3 + ZrO2 + TiO2 (wt %) | ZnO/(ZnO + Al2O3 + ZrO2 + TiO2) | (ZnO + Al2O3 + ZrO2)/(Na2O + K2O) | (SiO2 + B2O3 + F2)/(Na2O + K2O + ZnO) |
|---|---|---|---|---|---|---|
| 1 | 0.6 | 21 | 21 | 0.76 | 1.0 | 1.57 |
| 2 | 1 | 21 | 21 | 0.76 | 1.0 | 1.57 |
| 3 | 1.5 | 21 | 21 | 0.76 | 1.0 | 1.57 |
| 4 | 2.1 | 21 | 21 | 0.76 | 1.0 | 1.57 |
| 5 | 3 | 21 | 21 | 0.76 | 1.0 | 1.57 |
| 6 | 4.2 | 21 | 21 | 0.76 | 1.0 | 1.57 |
| 7 | 6.4 | 21 | 21 | 0.76 | 1.0 | 1.57 |
| 8 | 2.1 | 21 | 21 | 0.76 | 1.0 | 1.57 |
| 9 | 2.1 | 21 | 21 | 0.76 | 1.0 | 1.57 |
| 10 | 2.1 | 21 | 21 | 0.76 | 1.0 | 1.57 |
| 11 | 2.2 | 21 | 21 | 0.76 | 1.0 | 1.57 |
| 12 | 2.1 | 21 | 21 | 0.76 | 1.0 | 1.57 |
| 13 | 2.1 | 14 | 21 | 0.76 | 1.5 | 2.17 |
| 14 | 2.1 | 15 | 21 | 0.76 | 1.4 | 2.06 |
| 15 | 2.1 | 17 | 21 | 0.76 | 1.24 | 1.88 |
| 16 | 2.2 | 19 | 21 | 0.76 | 1.11 | 1.71 |
| 17 | 2.2 | 25 | 21 | 0.76 | 0.95 | 1.5 |
| 18 | 2.2 | 25 | 21 | 0.76 | 0.84 | 1.32 |
| 19 | 2.1 | 26 | 21 | 0.76 | 0.81 | 1.26 |
| 20 | 2.1 | 15 | 21 | 0.76 | 1.4 | 2.06 |
| 21 | 2.2 | 16 | 21 | 0.76 | 1.31 | 1.97 |
| 22 | 2.1 | 18 | 21 | 0.76 | 1.17 | 1.79 |
| 23 | 2.1 | 20 | 21 | 0.76 | 1.05 | 1.64 |
| 24 | 2.1 | 23 | 21 | 0.76 | 0.91 | 1.44 |
| 25 | 2.1 | 27 | 21 | 0.76 | 0.81 | 1.26 |
| 26 | 2.1 | 27 | 21 | 0.76 | 0.78 | 1.21 |
| 27 | 2.2 | 16 | 21 | 0.76 | 1.31 | 1.97 |
| 28 | 2.1 | 17 | 21 | 0.76 | 1.24 | 1.88 |
| 29 | 2.2 | 19 | 21 | 0.76 | 1.11 | 1.71 |
| 30 | 2.1 | 24 | 21 | 0.76 | 0.88 | 1.38 |
| 31 | 2.1 | 27 | 21 | 0.76 | 0.78 | 1.21 |
| 32 | 2.2 | 28 | 21 | 0.76 | 0.75 | 1.16 |
| 33 | 2.2 | 19 | 21 | 0.76 | 1.11 | 1.71 |
| 34 | 2.2 | 22 | 21 | 0.76 | 0.95 | 1.5 |
| 35 | 2.1 | 27 | 21 | 0.76 | 0.78 | 1.21 |
| 36 | 2.1 | 30 | 21 | 0.76 | 0.7 | 1.07 |
| 37 | 2.1 | 20 | 21 | 0.76 | 1.05 | 1.64 |
| 38 | 2.1 | 23 | 21 | 0.76 | 0.91 | 1.44 |
| 39 | 2.2 | 28 | 21 | 0.76 | 0.75 | 1.16 |
| 40 | 2.2 | 31 | 21 | 0.76 | 0.68 | 1.02 |
| 41 | 2.2 | 21 | 13 | 0.62 | 0.62 | 2.28 |
| 42 | 2.1 | 21 | 15 | 0.67 | 0.71 | 2.06 |
| 43 | 2.2 | 21 | 19 | 0.72 | 0.86 | 1.80 |
| 44 | 2.1 | 21 | 20 | 0.75 | 0.95 | 1.64 |
| 45 | 2.1 | 21 | 23 | 0.78 | 1.10 | 1.44 |
| 46 | 2.2 | 21 | 25 | 0.8 | 1.19 | 1.32 |
| 47 | 2.2 | 21 | 28 | 0.82 | 1.33 | 1.16 |
| 48 | 2.0 | 21 | 16 | 0.0 | 0.76 | 2.03 |
| 49 | 2.1 | 21 | 17 | 0.94 | 0.81 | 1.68 |
| 50 | 2.2 | 21 | 18 | 0.89 | 0.86 | 1.65 |
| 51 | 2.2 | 21 | 19 | 0.84 | 0.90 | 1.62 |
| 52 | 2.1 | 21 | 21 | 0.76 | 1.0 | 1.57 |
| 53 | 2.1 | 21 | 23 | 0.70 | 1.10 | 1.51 |
| 54 | 2.1 | 21 | 26 | 0.62 | 1.24 | 1.43 |
| 55 | 2.1 | 21 | 17 | 0.94 | 0.81 | 1.68 |
| 56 | 2.2 | 21 | 18 | 0.89 | 0.86 | 1.65 |
| 57 | 2.2 | 21 | 19 | 0.84 | 0.90 | 1.62 |
| 58 | 2.1 | 21 | 21 | 0.76 | 1.0 | 1.57 |
| 59 | 2.1 | 21 | 23 | 0.70 | 1.1 | 1.51 |
| 60 | 2.1 | 21 | 26 | 0.62 | 1.24 | 1.43 |

TABLE 5-2-continued

| Test No. | Total Content of SiO$_2$ + B$_2$O$_3$ (wt %) | Total Content of Na$_2$O + K$_2$O (wt %) | Total Content of ZnO + Al$_2$O$_3$ + ZrO$_2$ + TiO$_2$ (wt %) | ZnO/(ZnO + Al$_2$O$_3$ + ZrO$_2$ + TiO$_2$) | (ZnO + Al$_2$O$_3$ + ZrO$_2$)/ (Na$_2$O + K$_2$O) | (SiO$_2$ + B$_2$O$_3$ + F$_2$)/(Na$_2$O + K$_2$O + ZnO) |
|---|---|---|---|---|---|---|
| 61 | 2.1 | 21 | 17 | 0.94 | 0.81 | 1.68 |
| 62 | 2.2 | 21 | 18 | 0.89 | 0.86 | 1.65 |
| 63 | 2.2 | 21 | 19 | 0.84 | 0.90 | 1.62 |
| 64 | 2.1 | 21 | 21 | 0.76 | 1.0 | 1.57 |
| 65 | 2.1 | 21 | 23 | 0.70 | 1.1 | 1.51 |
| 66 | 2.1 | 21 | 26 | 0.62 | 1.24 | 1.43 |
| 67 | 2.1 | 21 | 20 | 0.8 | 0.95 | 1.59 |
| 68 | 2.2 | 21 | 22 | 0.73 | 1.05 | 1.54 |
| 69 | 2.2 | 21 | 22 | 0.73 | 1.05 | 1.54 |
| 70 | 2.1 | 21 | 20 | 0.8 | 0.95 | 1.59 |
| 71 | 2.1 | 21 | 24 | 0.67 | 1.14 | 1.49 |
| 72 | 2.2 | 21 | 25 | 0.64 | 1.19 | 1.46 |
| 73 | 2.1 | 21 | 21 | 0.76 | 1.0 | 1.57 |
| 74 | 2.2 | 21 | 24 | 0.67 | 1.14 | 1.49 |
| 75 | 2.1 | 21 | 26 | 0.62 | 1.24 | 1.43 |
| 76 | 2.1 | 21 | 27 | 0.59 | 1.29 | 1.4 |
| 77 | 2.2 | 21 | 28 | 0.57 | 1.33 | 1.38 |
| 78 | 2.1 | 21 | 27 | 0.59 | 1.29 | 1.41 |
| 79 | 2.2 | 21 | 28 | 0.57 | 1.33 | 1.38 |
| 80 | 2.1 | 21 | 29 | 0.55 | 1.38 | 1.35 |
| 81 | 2.0 | 21 | 21 | 0.76 | 1.0 | 1.54 |
| 82 | 2.1 | 21 | 21 | 0.76 | 1.0 | 1.49 |
| 83 | 2.0 | 21 | 21 | 0.76 | 1.0 | 1.46 |
| 84 | 2.0 | 21 | 21 | 0.76 | 1.0 | 1.54 |
| 85 | 2.1 | 21 | 21 | 0.76 | 1.0 | 1.49 |
| 86 | 2.0 | 21 | 21 | 0.76 | 1.0 | 1.46 |
| 87 | 2.0 | 21 | 21 | 0.76 | 1.0 | 1.54 |
| 88 | 2.1 | 21 | 21 | 0.76 | 1.0 | 1.49 |
| 89 | 2.0 | 21 | 21 | 0.76 | 1.0 | 1.46 |
| 90 | 2.0 | 21 | 21 | 0.76 | 1.0 | 1.54 |
| 91 | 2.1 | 21 | 21 | 0.76 | 1.0 | 1.49 |
| 92 | 2.0 | 21 | 21 | 0.76 | 1.0 | 1.46 |

TABLE 6

| Test No. | Characteristics of Frit | | | Surface Defects of Enamel Layer | | | Characteristics of Enamel Layer | | | Overall Evaluation |
| | Softening Point (°C.) | Solubility in Hot Water | Expansion Coefficient (× 10$^{-7}$ deg$^{-1}$) | Orange Peel | Wave | Pinhole | Gloss | ΔE | Adherence | |
|---|---|---|---|---|---|---|---|---|---|---|
| 1 | 538 | Bad | 104.2 | Bad | Good | Good | Good | Bad | Good | Bad |
| 2 | 545 | Moderate | 105.7 | Bad | Good | Good | Good | Moderate | Good | Bad |
| 3 | 560 | Good | 106.9 | Good | Good | Good | Good | Good | Good | Good |
| 4 | 573 | Good | 107.8 | Good | Good | Good | Good | Good | Good | Good |
| 5 | 585 | Good | 108.8 | Good | Good | Good | Good | Good | Good | Good |
| 6 | 601 | Good | 109.5 | Good | Good | Bad | Bad | Bad | Moderate | Bad |
| 7 | 620 | Good | 110.2 | Good | Good | Bad | Bad | Bad | Moderate | Bad |
| 8 | 570 | Moderate | 109.0 | Good | Good | Good | Good | Bad | Good | Bad |
| 9 | 572 | Good | 108.7 | Good | Good | Good | Good | Good | Good | Good |
| 10 | 575 | Good | 107.5 | Good | Good | Good | Good | Good | Good | Good |
| 11 | 575 | Good | 107.2 | Good | Good | Good | Good | Good | Good | Good |
| 12 | 576 | Good | 106.7 | Bad | Good | Good | Bad | Good | Good | Bad |
| 13 | 608 | Good | 86.9 | Good | Good | Bad | Bad | Good | Moderate | Bad |
| 14 | 605 | Good | 90.0 | Good | Good | Bad | Bad | Good | Moderate | Bad |
| 15 | 593 | Good | 96.3 | Good | Good | Good | Bad | Good | Good | Bad |
| 16 | 586 | Good | 102.7 | Good | Good | Good | Bad | Good | Good | Bad |
| 17 | 570 | Good | 112.1 | Good | Good | Good | Bad | Good | Good | Bad |
| 18 | 564 | Moderate | 121.5 | — | — | — | — | — | — | Bad |
| 19 | 562 | Bad | 124.9 | — | — | — | — | — | — | Bad |
| 20 | 603 | Good | 89.5 | Good | Good | Bad | Bad | Good | Moderate | Bad |
| 21 | 596 | Good | 92.8 | Good | Good | Good | Good | Good | Good | Good |
| 22 | 590 | Good | 98.9 | Good | Good | Good | Good | Good | Good | Good |
| 23 | 578 | Good | 105.3 | Good | Good | Good | Good | Good | Good | Good |
| 24 | 569 | Good | 114.7 | Good | Good | Good | Good | Good | Good | Good |
| 25 | 558 | Bad | 124.1 | — | — | — | — | — | — | Bad |
| 26 | 552 | Bad | 127.2 | — | — | — | — | — | — | Bad |
| 27 | 598 | Good | 92.3 | Good | Good | Good | Moderate | Good | Good | Good |
| 28 | 593 | Good | 101.7 | Good | Good | Good | Good | Good | Good | Good |
| 29 | 586 | Good | 101.7 | Good | Good | Good | Good | Good | Good | Good |
| 30 | 564 | Good | 117.2 | — | — | — | — | — | — | Bad |
| 31 | 552 | Bad | 126.7 | — | — | — | — | — | — | Bad |
| 32 | 548 | Bad | 130.0 | — | — | — | — | — | — | Bad |

TABLE 6-continued

| Test No. | Characteristics of Frit Softening Point (°C.) | Solubility in Hot Water | Expansion Coefficient ($\times 10^{-7}$ deg$^{-1}$) | Surface Defects of Enamel Layer Orange Peel | Wave | Pinhole | Characteristics of Enamel Layer Gloss | $\Delta E$ | Adherence | Overall Evaluation |
|---|---|---|---|---|---|---|---|---|---|---|
| 33 | 586 | Good | 100.2 | Good | Good | Good | Good | Good | Good | Good |
| 34 | 575 | Good | 109.6 | Good | Good | Good | Good | Good | Good | Good |
| 35 | 553 | Moderate | 125.2 | — | — | — | — | — | — | Bad |
| 36 | 538 | Bad | 134.6 | — | — | — | — | — | — | Bad |
| 37 | 581 | Good | 102.8 | Good | Good | Good | Good | Bad | Good | Bad |
| 38 | 571 | Good | 112.2 | Good | Good | Good | Good | Bad | Good | Bad |
| 39 | 550 | Bad | 128.0 | — | — | — | — | — | — | Bad |
| 40 | 534 | Bad | 137.4 | — | — | — | — | — | — | Bad |
| 41 | 600 | Bad | 96.1 | Good | Good | Good | Good | Bad | Good | Bad |
| 42 | 592 | Bad | 98.9 | Good | Good | Good | Good | Bad | Good | Bad |
| 43 | 583 | Good | 105.0 | Good | Good | Good | Good | Good | Good | Good |
| 44 | 576 | Good | 106.4 | Good | Good | Good | Good | Good | Good | Good |
| 45 | 570 | Good | 110.9 | Good | Good | Good | Good | Good | Good | Good |
| 46 | 567 | Good | 113.9 | Good | Good | Good | Good | Good | Good | Good |
| 47 | 559 | Good | 118.3 | — | — | — | — | — | — | Bad |
| 48 | 553 | Bad | 106.5 | Bad | Good | Good | Moderate | Bad | Good | Bad |
| 49 | 558 | Bad | 106.7 | Bad | Good | Good | Moderate | Bad | Good | Bad |
| 50 | 562 | Good | 107.0 | Good | Good | Good | Good | Good | Good | Good |
| 51 | 570 | Good | 107.0 | Good | Good | Good | Good | Good | Good | Good |
| 52 | 585 | Good | 107.0 | Good | Good | Good | Good | Good | Good | Good |
| 53 | 600 | Good | 107.2 | Good | Good | Bad | Bad | Good | Moderate | Bad |
| 54 | 615 | Good | 107.4 | Good | Good | Bad | Bad | Good | Moderate | Bad |
| 55 | 556 | Bad | 107.2 | Bad | Good | Good | Moderate | Bad | Good | Bad |
| 56 | 560 | Good | 107.8 | Good | Good | Good | Good | Good | Good | Good |
| 57 | 568 | Good | 108.3 | Good | Good | Good | Good | Good | Good | Good |
| 58 | 584 | Good | 109.1 | Good | Good | Good | Good | Good | Good | Good |
| 59 | 600 | Good | 110.2 | Good | Good | Bad | Bad | Good | Moderate | Bad |
| 60 | 612 | Good | 117.7 | Good | Good | Bad | Bad | Good | Moderate | Bad |
| 61 | 550 | Bad | 107.2 | Bad | Good | Good | Good | Bad | Good | Bad |
| 62 | 554 | Good | 108.0 | Good | Good | Good | Good | Good | Good | Good |
| 63 | 562 | Good | 108.5 | Good | Good | Good | Good | Good | Good | Good |
| 64 | 577 | Good | 109.5 | Good | Good | Good | Good | Good | Good | Good |
| 65 | 592 | Good | 110.7 | Good | Good | Good | Good | Bad (blushing) | Good | Bad |
| 66 | 603 | Good | 112.4 | Good | Good | Good | Good | Bad (blushing) | Good | Bad |
| 67 | 568 | Good | 107.8 | Good | Good | Good | Good | Good | Good | Good |
| 68 | 576 | Good | 108.9 | Good | Good | Good | Good | Good | Good | Good |
| 69 | 578 | Good | 109.1 | Good | Good | Good | Good | Good | Good | Good |
| 70 | 568 | Good | 107.4 | Good | Good | Good | Good | Good | Good | Good |
| 71 | 582 | Good | 109.4 | Good | Good | Good | Good | Good | Good | Good |
| 72 | 599 | Good | 110.2 | Good | Good | Bad | Moderate | Good | Moderate | Bad |
| 73 | 575 | Good | 107.4 | Good | Good | Good | Good | Good | Good | Good |
| 74 | 596 | Good | 109.5 | Good | Good | Good | Good | Good | Good | Good |
| 75 | 608 | Good | 110.2 | Good | Good | Bad | Moderate | Bad | Moderate | Bad |
| 76 | 612 | Good | 110.7 | Good | Good | Bad | Bad | Bad | Bad | Bad |
| 77 | 615 | Good | 111.3 | Good | Good | Bad | Bad | Bad | Bad | Bad |
| 78 | 613 | Good | 110.1 | Good | Good | Bad | Bad | Bad | Bad | Bad |
| 79 | 616 | Good | 110.8 | Good | Good | Bad | Bad | Bad | Bad | Bad |
| 80 | 619 | Good | 111.3 | Good | Good | Bad | Bad | Bad | Bad | Bad |
| 81 | 553 | Good | 109.8 | Good | Good | Good | Good | Good | Good | Good |
| 82 | 543 | Good | 110.8 | Good | Good | Good | Good | Good | Good | Good |
| 83 | 528 | Moderate | 111.2 | Bad | Good | Good | Bad | Moderate | Good | Bad |
| 84 | 570 | Good | 110.8 | Good | Good | Good | Good | Good | Good | Good |
| 85 | 565 | Good | 111.8 | Good | Good | Good | Good | Good | Good | Good |
| 86 | 560 | Good | 112.2 | Bad | Good | Good | Bad | Moderate | Good | Bad |
| 87 | 571 | Good | 109.2 | Good | Good | Good | Good | Good | Good | Good |
| 88 | 567 | Good | 110.6 | Good | Good | Good | Good | Good | Good | Good |
| 89 | 563 | Good | 111.4 | Bad | Good | Good | Bad | Moderate | Good | Bad |
| 90 | 571 | Good | 110.1 | Good | Good | Good | Good | Good | Good | Good |
| 91 | 568 | Good | 111.1 | Good | Good | Good | Good | Good | Good | Good |
| 92 | 562 | Good | 111.5 | Bad | Good | Good | Bad | Moderate | Good | Bad |

The respective components of the frit compositions according to the present invention are described with reference to the above experimental results, in which percent is by weight.

(a) SiO$_2$ Component

Generally, if the amount of Si$_2$O in glass or frit increases, the thermal expansion coefficient decreases with an increase of softening point. In the practice of the invention, frits of low softening points are essential, so that the amount of SiO$_2$ has to be reduced.

The frits of Test Nos. 1 through 7 in Table 5-1 have varying contents of SiO$_2$. The results of Table 6 reveal that when the SiO$_2$ content is less than 31%, the solubility in hot water undesirably increases. In addition, the frits having SiO$_2$ contents less than 31% are not suitable for use in combination with red CdS pigments because the pigments readily react with free alkaline components and thus become blackened, i.e. the afore-discussed requirement (a) cannot be satisfied. On the contrary, when the $SiO_2$ content exceeds 39%, the softening point becomes so high that it is difficult to fire the frits at intended low temperatures, causing red pigments to undergo thermal oxidation as described hereinbefore. This is contrary to the requirements (b) and (c). Gathering the above, the content of $SiO_2$ is suitably in the range of 31 to 39%. Starting materials for $SiO_2$ are all siliceous materials including, for example, siliceous sand, siliceous stone, feldspar and the like.

(b) $B_2O_3$ Component

Typical starting materials for $B_2O_3$ are borax ($Na_2B_4O_7.10H_2O$), anhydrous borax ($Na_2B_4O_7$), boric acid ($H_3BO_4$) and the like. When various starting materials of frit are mixed together and heated at 1200° C. or higher for vitrification, this component plays a very important role in smelting the other materials. This is because a starting material for $B_2O_3$ is very low in melting point, e.g. borax has a melting point as low as 747° C. Moreover, this component serves to improve the adherence between frit and base metal and the surface gloss after firing.

As will be clearly seen from the results of Test Nos. 1 through 7 in Tables 5-1 and 6, the content of $B_2O_3$ exceeding 21% involves problems in solubility in water and color developability. On the other hand, less contents than 13% are also unfavorable with respect to surface gloss, softening point and color developability. Although waterproof and color developability have relation with a $SiO_2$ to $B_2O_3$ ratio as described hereinafter, a suitable range of $B_2O_3$ can cover from 13 to 21%.

(c) $F_2$ Component

Starting materials for $F_2$ component include, for example, fluorite ($CaF_2$), cryolite ($3NaF.AlF_3$), sodium fluoride (NaF), aluminium fluoride ($AlF_3$), sodium silicofluoride ($Na_2SiF_6$), potassium silicofluoride ($K_2SiF_6$) and the like.

$F_2$ component is ordinarily important as an indirect opaciliser and a smelting agent and also as an acidic component in frit. In the practice of the invention, this component is essential. As discussed hereinbefore, CdS red pigments tend to react with alkaline components and the frit of the invention needs larger amounts of acidic components than conventional enamel frits. Aside from $F_2$, $SiO_2$ and $B_2O_3$ are used as the acidic component. However, presence of $SiO_2$ and $B_2O_3$ in excess results in too high softening point and poor waterproof. $SiO_2$ and $B_2O_3$ are lower in acidity than $F_2$ and have a less effect of neutralizing alkaline components therewith. From the results of Test Nos. 8 through 12 of Table 6, $F_2$ is determined to range from 2 to 10%. It is known that $F_2$ component tends to scatter by 30 to 50% of the theoretical during the production of frit. In this connection, the optimum range of $F_2$ component in the practice of the invention means a range of $F_2$ contained in final frit. Less amounts are unfavorable because alkaline components in frit cannot be satisfactorily neutralized with $F_2$, permitting CdS red pigments to react with the remaining alkaline components thereby making a black enamel surface. Thus, the requirement (a) cannot be satisfied. Larger amounts result in evolution of a multitude of bubbles in enamel layer and thus poor appearance, coupled with another disadvantage that a pot is liable to be attacked at the time of manufacture of frit.

(d) $R_2O$ Components $R_2O$ components used herein mean alkaline components including $Na_2$, $K_2O$ and $Li_2O$. The $R_2O$ components serve as a potential smelting agent, increasing the fluidity of molten glaze and lowering the softening point of frit. However, if $R_2O$ components are not used in proper amounts, resistances to water and weathering decrease. Moreover, these components give a great influence on the color formation or coloration with CdS red pigments and drastically change the expansion coefficient of frit.

Among these $R_2O$ components, the effect of lowering softening point decreases in the following order: $Li_2O > Na_2O > K_2O$. The tendency of impeding the color formation of CdS red pigments is as follows: $Li_2O > K_2O \geq Na_2O$. In order to obtain a frit which is stably colored and has a low softening point, it is important to determine not only amounts of the individual components, but also a total amount of specifically selected components.

The results of Test Nos. 13 to 40 reveal that when the total amount of $Na_2O$ and $K_2O$ is smaller than 16%, the softening point increases and the gloss, color difference and adherence are not satisfactory. On the other hand, when the total amount exceeds 23%, the waterproof of frit extremely lowers with an increase of the thermal expansion coefficient to an extent outside the aforementioned optimum range of 85 to $115 \times 10^{-7}$ deg$^{-1}$. This results in chipping of enamel layer upon cooling after firing. From the above, the total amount of $Na_2O$ and $K_2O$ is conveniently in the range of from 16 to 23%.

Amounts of the individual $R_2O$ components are described. $Na_2O$ are is more effective than $K_2O$ with respect to fusibility of frit and gives a less adverse influence on the color formation of CdS red pigments than $K_2O$. Upon comparison of the test results of Nos. 13 to 40, $Na_2O$ is conveniently in the range of 14 to 22% from the viewpoint of the gloss, color difference, adherence and expansion coefficient.

$K_2O$ improves fusibility of frit and gloss of enamel layer. The results of Test Nos. 13 to 40 reveal that $K_2O$ is in the range of 1 to 5%. Less amounts are unfavorable because good gloss cannot be obtained on the enamel surface. On the contrary, larger amounts give adverse influences on pigments. $K_2O$ is more expensive than $N_2O$ and can cover a preferable range of 1.5 to 3%.

$Li_2O$ is not a component essential for the frit of the present invention but plays a role in lowering softening point of frit similar to other $Na_2O$ and $K_2O$. Especially, $Li_2O$ can lower softening point remarkably when added even in small amounts. Although $Li_2O$ does not increase the thermal coefficient so much as compared with $Na_2O$ and $K_2O$, it may exert adverse influences on the gloss, surface defects and color tone and care should be taken to the amount of $Li_2O$.

From the test results of Nos. 81 to 83, it will be found that the softening point sharply decreases with an increase of amount of $Li_2O$. When the amount exceeds 4%, the enamel layer has surface defects and particularly orange peel appears with a reduction of gloss. Such defects also give a great influence on the color of the layer. Accordingly, $Li_2O$ is preferably present in an amount ranging 0 to 4%.

Starting materials for $R_2O$ components are described. $Na_2O$ can be derived not only from simple components such as $Na_2CO_3$ and $NaNO_3$, but also from borax, sodium silicofluoride, cryolite, feldspar and the like.

Likewise, starting materials for $K_2O$ include not only $KNO_3$ and $K_2CO_3$, but also potassium fluoride and feldspar. Li$_2$O component may be produced from an industrial reagent of Li$_2$CO$_3$ which is expensive. Natural ores such as, for example, spodumene can be used.

(e) R'O Components

R'O components used herein mean alkaline earth metal oxides such as CaO, ZnO, BaO, MgO and the like. R'O components serve also as a fusing or smelting agent but not so potential as alkali metal oxides. They have the capability of lowering softening point of frit and improving mechanical properties such as modulus of elasticity, tensile strength and the like. Completely different from alkali metal oxides, alkaline earth metal oxides can improve waterproof and chemical endurance of frit. Waterproof and acid resistance improved by alkaline earth metals decrease in the following orders, respectively.

Waterproof: ZnO > MgO > CaO > BaO

Acid Resistance: ZnO > CaO > MgO > BaO

The influences of the individual R'O components in frit were determined in Test Nos. 41 to 47 and 84 to 92.

As will be apparent from the results of these tests, CaO, BaO and MgO lower the gloss of enamel surface with an increase of their amounts. In contrast, only ZnO rather imparts gloss to enamel surface and does not reduce gloss so much even though its amount is increased.

It is known that intermediate oxides, ZrO$_2$, Al$_2$O$_3$ and TiO$_2$, show remarkable effects on waterproof and acid resistance. The relations between the intermediate oxides and alkaline earth metal oxides are as follows with respect to waterproof and acid resistance.

Waterproof:
ZrO$_2$ > Al$_2$O$_3$ > TiO$_2$ > ZnO
MgO > CaO > BaO

Acid Resistance:
ZrO$_2$ > Al$_2$O$_3$ > ZnO > CaO
TiO$_2$ > MgO > BaO

Thus, ZnO component is comparable to the intermediate oxides with regard to waterproof and acid resistance and can thus improve these properties as well as gloss. In this sense, ZnO is a very important component of the enamel frit of the invention and is thus essential.

The content of ZnO below 13% produces an adverse influence on the waterproof and color development of CdS red pigments by the action of free alkaline components. With the content over 20%, the thermal expansion coefficient exceeds $115 \times 10^{-7}$ deg$^{-1}$, with the tendency that cracks are produced and the enamel layer is chipped upon cooling after firing.

For the reasons described above, ZnO ranges from 13 to 20%, preferably from 14 to 18.

CaO, BaO and MgO components are not essential for the practice of the invention but may be used to improve mechanical properties such as modulus of elasticity, tensile strength and the like. For this purpose, CaO, BaO and/or MgO is used in an amount below 4%. As will be clearly seen from the results of Test Nos. 84 to 92, this is because when the content of the component is over 4%, the gloss of enamel layer is considerably reduced and orange peel surface is formed. These components may be used in combination and the total amount is below 4%.

Starting materials for ZnO are zinc flower, zinc carbonate and the like. CaO component can be derived not only from calcium carbonate, calcium hydroxide and the like, but also from fluorite, dolomite and the like. Starting materials for MgO component include, aside from magnesium carbonate and magnesia, dolomite. Starting materials for BaO component include barium carbonate, barium nitrate, barium fluoride and the like.

(f) Intermediate Oxide Components

The intermediate oxide components include Al$_2$O$_3$, TiO$_2$ and ZrO$_2$. These components have the effect of reducing solubilities of frit in hot water and acidic solution. For instance, the waterproof and acid resistance of these components decrease as follows.

Waterproof: ZrO$_2$ > Al$_2$O$_3$ > TiO$_2$

Acid resistance: ZrO$_2$ > Al$_2$O$_3$ > TiO$_2$

Too much amounts of these components will increase the softening point of frit and lower the gloss of enamel layer. Choice is important with respect to the amount and type of the intermediate oxide.

The influence of the intermediate oxides on the softening point of frit is in the following order:

$$Al_2O_3 \gtrsim ZrO_2 > TiO_2$$

The total content of these three components should be in the range of 2 to 9% as will be seen from the results of Test Nos. 49 to 80. Less contents give adverse influences on the water proof and color development of CdS red pigments by the action of excess alkaline components. Over 9%, the softening point of the resulting frit increases over 600° C. and pinholes are produced in enamel layer. Accordingly, the gloss is adversely influenced, and because CdS red pigments are not coated or covered with molten glass at temperatures below 600° C., they tend to undergo thermal oxidation. As a consequence, the enamel layer unfavorably becomes black.

The upper limit of each of these intermediate oxides is in the range up to 5%. These components should suitably be selected, as used singly or in combination, depending on the intended softening point, water proof, surface gloss and color tone of enamel layer.

When either Al$_2$O$_3$ or ZrO$_2$ is used in amounts exceeding 5%, good waterproof is attained but unsatisfactory results are produced with respect to the softening point, surface gloss and color tone.

When used in amounts over 5%, TiO$_2$ does not give such an adverse influence on the softening point and surface gloss as Al$_2$O$_3$ and ZrO$_2$. However, the resultant frit becomes opaque. Even though red or other pigments are added to this frit, it assumes a whitish vague color, contrary to the purpose of the invention.

Starting materials for these intermediate oxide components are described.

ZrO$_2$ component is preferably zircon (ZrO$_2$.nSiO$_2$) because naturally occurring products contain impurities such as Fe$_2$O$_3$ and purified products are expensive. Zircon is not only inexpensive, but also more fusible than in the case of ZrO$_2$ alone.

TiO$_2$ may be either of the rutile type or the anatase type. That is, both the types are likewise usable in the present invention.

Al$_2$O$_3$ component can be derived from alumina, aluminium hydroxide or the like. Because this component is usually contained in cryolite, feldspar or the like, suitable starting materials should be selected depending on the frit composition.

(g) Other Components

Aside from the above-described components, other components such as MoO$_3$, V$_2$O$_5$, SnO and the like may be added to the frit of the invention. These components can further improve the adherence of frit to base metal. In general, the adherence may be improved by addition of NiO, CuO, CoO, MnO$_2$ and the like, aside from the just-mentioned components. However, these components will undesirably color frits therewith even when added in very small amounts. For example, addition of NiO results in green frit, addition of CuO in brown frit and addition of CoO in blue frit. These colored frits are not unsatisfactory in case where intended colors are close to those developed by the oxides. However, where it is intended to develop colors such as yellow, red and orange which are in complementary color relation with those colors of the colored frits, the resulting enamels will disadvantageously assume dark color. This is contrary to the purpose of the invention in which stably colored transparent enamel frits are provided over the whole range of colors. Accordingly, MoO$_3$, SnO$_2$ and V$_2$O$_5$ are effective for further improving the adherence. As a matter of course, color of frit remains colorless when these oxides are added. These components are preferably added in an amount up to 3% when used singly or even in combination. Larger amounts than 3% do not improve adherence so much and are disadvantageous in economy with an attendant tendency that softening point slightly increases. Most preferably, these components are used in the range of 0.3 to 1%.

(5) Total Contents and Ratios of Specific Components

In Table 5-2, there are shown sums and ratios of certain components, which are important parameters for defining frit compositions of the present invention.

(a) SiO$_2$/B$_2$O$_3$ Ratio

SiO$_2$ and B$_2$O$_3$ are important oxides in forming the network structure of glass. The ratio of these network-forming oxide components has an important role in determining physical and chemical properties of frit.

SiO$_2$ component forms the network structure of tetrahedral cordination of SiO$_2$ in glass and B$_2$O$_3$ constitutes the network structures of triangular and tetrahedral cordinations of BO$_3$ and BO$_4$, respectively. The physical properties (softening point, thermal expansion coefficient and the like) and chemical properties (waterproof, color stability and the like) of frit are determined depending on the network structure in which alkaline components are incorporated. The amounts of SiO$_2$ and B$_2$O$_3$ components are as defined hereinbefore and a SiO$_2$/B$_2$O$_3$ ratio is one of important factors which determine the physical and chemical properties of frit.

The SiO$_2$/B$_2$O$_3$ ratio in the frit of the present invention should be in the range of 1.5 to 3:1. Smaller ratios are not favorable because alkaline components incorporated in the network structure can simply be released such as by water. Thus, the frit becomes very poor in water proof. If CdS red pigments are used, the released alkali reacts with the pigments to form black CdO. On the contrary, when the ratio is over 3:1, the waterproof is improved but the softening point of frit exceeds 600° C. whereby CdS red pigments undergo thermal oxidation during firing and are converted into CdO which is black in color.

(b) Total Amounts of ZnO+Al$_2$O$_3$+TiO$_2$+ZrO$_2$ and Na$_2$O+K$_2$O

ZnO not only improves the water proof, but also lowers the softening point of frit and increases expansion coefficient. The intermediate oxides including Al$_2$O$_3$, TiO$_2$ and ZrO$_2$ remarkably improve the waterproof but do not increase the thermal expansion coefficient so much. Moreover, they serve to increase the softening point of frit as described hereinbefore. The total content of these components is an important factor which greatly affects the waterproof, thermal expansion coefficient and softening point of frit.

The total content of ZnO, Al$_2$O$_3$, TiO$_2$ and ZrO$_2$ is conveniently in the range of 17 to 25%. Less contents are unfavorable because of considerable deterioration in waterproof. With contents over 25% where the ratio of the intermediate oxide or oxides to ZnO is relatively high (e.g. Test No. 60), the softening point of frit remarkably increases, giving an adverse influence on gloss and color developability. On the contrary, where the ratio of ZnO to the intermediate oxide or oxides is high (Test No. 47), the expansion coefficient of frit exceeds $115 \times 10^{-7}$ deg$^{-1}$, causing the enamel layer to be chipped.

For the above-described reasons, the total content of ZnO, Al$_2$O$_3$, TiO$_2$ and ZrO$_2$ is in the range of 17 to 25%, preferably 18 to 23%.

Na$_2$O and K$_2$O components are important in lowering the softening point of frit and may reduce the waterproof depending on the amount thereof. Additionally, they exert great influences on the color development of CdS red pigments and also on the expansion coefficient of frit. Accordingly, the total content of these components give great influences on the softening point, water proof, expansion coefficient and color developability as described hereinbefore.

When the content of Na$_2$O and K$_2$O is below 16% (Test No. 20), the softening point of frit increases with the resulting enamel layer deteriorating with respect to gloss, color tone and adherence. The content of Na$_2$O and K$_2$O exceeding 23% results in extremely lowering the waterproof of frit and increasing the expansion coefficient of frit, causing the enamel layer to be chipped.

Accordingly, the content of Na$_2$O and K$_2$O is in the range of 16 to 23%, preferably 17 to 21%.

(c) Ratio of ZnO/ZnO+Al$_2$O$_3$+TiO$_2$+ZrO$_2$

ZnO, Al$_2$O$_3$, TiO$_2$ and ZrO$_2$ components are capable of improving chemical properties such as waterproof as described before. This capability decreases in the following order.

$$ZrO_2 > Al_2O_3 > TiO_2 > ZnO$$

While the intermediate oxide components of ZrO$_2$, Al$_2$O$_3$ and TiO$_2$ serve to pronouncedly increase the softening point of frit, ZnO is an component which lowers the softening point. That is, the ratio of ZnO to ZnO+Al$_2$O$_3$+TiO$_2$+ZrO$_2$ is the most important factor which determines the waterproof and softening point of frit. Where the ratio is below 0.65:1, e.g. the amount of ZnO is small relative to the intermediate oxides (Test Nos. 41, 42), the waterproof of frit lowers and the color tone is adversely affected. On the other hand, when the content of the intermediate oxides is relatively large with respect to ZnO (Test Nos. 54, 60, 66, 72), the softening point of frit becomes higher than as intended, giving adverse influences on the gloss, surface states and color tone. With the ratio exceeding 0.9:1, e.g. the content of the intermediate oxides is small relative to ZnO (Test Nos. 48, 49, 55), the waterproof of frit considerably lowers. Moreover, an attempt was made to improve the waterproof of frit by increasing an amount of ZnO alone while keeping the amount of the intermediate oxides at a low level. The results were unsatisfactory because the expansion coefficient of frit exceeded $115 \times 10^{-7}$ deg$^{-1}$. Accordingly, the ratio of ZnO/ZnO+Al$_2$O$_3$+TiO$_2$+ZrO$_2$ is in the range of 0.65 to 0.9:1, preferably 0.7 to 0.85:1.

(d) Ratio of (ZnO+Al$_2$O$_3$+TiO$_2$+ZrO$_2$)/(Na$_2$O+K$_2$O)

As described, the alkali metal oxides of Na$_2$O and K$_2$O act to lower the softening point of frit and remarkably increase the expansion coefficient. The components of ZnO, ZrO$_2$, Al$_2$O$_3$ and TiO$_2$ serve to improve chemical properties such as waterproof. The ratio of ZnO+Al$_2$O$_3$+TiO$_2$+ZrO$_2$ and Na$_2$O+K$_2$O is an important factor which greatly affects the properties such as of softening point, expansion coefficient and waterproof. In the practice of the invention, this ratio is in the range of 0.85 to 1.2:1. Less amounts result in releasing free alkaline components. As a result, the waterproof of frit lowers to a substantial extent and the requirement (a) for color development of CdS red pigments cannot be satisfied. The resulting enamel layer becomes black. When the ratio exceeds 1.2:1, the softening point of frit increases. This adversely affects the gloss of enamel layer and the requirements (b) and (c) for color development of CdS red pigments cannot be satisfied. Preferably, the ratio of (ZnO+Al$_2$O$_3$+TiO$_2$+ZrO$_2$)/(Na$_2$O+K$_2$O) is in the range of 0.9 to 1.1:1

(e) Ratio of (SiO$_2$+B$_2$O$_3$+F$_2$)/(Na$_2$O+K$_2$O+ZnO)

One of important features according to the present invention resides in that an enamel layer is stably colored using CdS red pigments which are chemically and thermally unstable. For this purpose, the aforedescribed requirements must be satisfied. The ratio of SiO$_2$+B$_2$O$_3$+F$_2$ and Na$_2$O+K$_2$O+ZnO has particular relation with the requirement (a).

Needless to say, Na$_2$O, K$_2$O and ZnO are alkaline components whereas SiO$_2$, B$_2$O$_3$ and F$_2$ are acidic components.

The ratio of the total contents of the acidic and alkaline components exhibits a balance between the acidic components and the alkaline components. If the ratio is below 1.3:1, the acid-base balance in frit is lost, so that alkaline components are released from frit to considerably lower the waterproof, extremely increase the expansion coefficient and cause the enamel layer to be chipped. On the contrary, when the ratio exceeds 2, the softening point of frit increases, giving an ill effect on the gloss of enamel layer. For these reasons, the ratio of (SiO$_2$+B$_2$O$_3$+F$_2$)/(Na$_2$O+K$_2$O+ZnO) is conveniently in the range of 1.3 to 2:1.

The frit compositions according to the present invention have been described in detail hereinabove. These frits have great merits over conventional counterparts. For instance, the frit of the invention can be applied to thin steel sheets which could not otherwise be used from the viewpoint of thermal stress or deformation caused by firing at high temperatures. This is particularly described.

The frit of Test No. 44 in Table 5-1 was applied onto steel sheets of different thicknesses. The test samples were then subjected to the measurement of firing stress. For comparison, a known high temperature enamel frit consisting of 55 w% of SiO$_2$, 12 wt% of B$_2$O$_3$, 17 wt% of Na$_2$O, 2 wt% of BaO, 5 wt% of F$_2$, 0.5 wt% of ZrO$_2$, 7 wt% of TiO$_2$ and 1.5 wt% of Al$_2$O$_3$ was used and treated in the same manner as in the above procedure.

Figure 2:
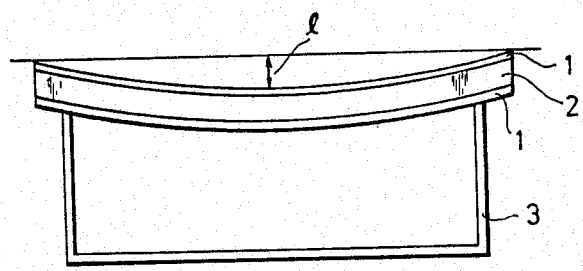
FIG. 2 is a schematic view of a thermally strained test piece.

The measurement of the firing stress was carried out as follows. Each of 60×300 mm steel sheets having predetermined thicknesses and free of strain was applied with a slip of each frit on both sides thereof in a thickness of 100 microns on each side. Thereafter, the applied sheet was horizontally placed on a support at a supporting distance of 250 mm as particularly shown in FIG. 1. In FIG. 1, indicated by 1 is a steel sheet, by 2 are enamel layers formed on opposite sides of the sheet, and by 3 is a support. The supported sheet was then fired at a predetermined temperature and allowed to cool. If strain was observed as shown in FIG. 2, a quantity of strain, 1, from the original horizontal line at the central portion was measured. The strain was evaluated as 'Good' for a value below 1 mm, as 'Moderate' for a value ranging from 1 to 3 mm, and as 'Bad' for a value over 3 mm.

Optimum firing conditions of the frit according to the invention were found to be 690° C. and 5 minutes and those of the known frit were 820° C. and 5 minutes.

The strain caused by firing under these conditions was measured in relation to the thickness of steel sheet. The results are shown in Table 8 below.

TABLE 8

| Frit | Thickness of Steel Sheet | | | | |
|---|---|---|---|---|---|
| | 0.4 mm | 0.5 mm | 0.6 mm | 0.8 mm | 1 mm |
| Known High Temperature Firing Frit | Bad | Bad | Moderate | Good | Good |
| Frit of Invention | Good | Good | Good | Good | Good |

The above results reveal that with the high temperature firing frit which must be fired at temperatures over 800°, steel sheets having thicknesses of 0.6 mm or larger are necessary when taking into account the strain occurring during the firing. Thus, enameled articles become heavy.

In contrast thereto, use of the frit according to the invention permits firing at temperatures below A$_1$ transformation point of iron, i.e. 723° C. Accordingly, base metal suffers little strain during firing and thus metal sheets as thin as 0.4 or 0.5 mm which could not be used for conventional frits can be used.

The firing temperature can be lowered by about 100 to 150° C. over those required for conventional frits whereby fuel cost can be reduced by 25 to 35%.

The adaptability of the frit compositions of the invention with CdS red pigments has been described. Other pigments as those indicated in Table 4 or TiO$_2$ can be likewise used. Proper choice of these pigments enables one to obtain enamel surfaces of various colors. In the practice of the invention, the amount of pigments including CdS or CdO is in the range of 1 to 10 wt% as usual. The frits of the invention which have relatively low softening points within the scope of the invention may be applied not only to ordinary enameling sheet steels, but also to aluminized steels, stainless steels and cast irons. The frits of the invention may be used for improving insulating property of various substrates as well as decorative purposes.

What is claimed is:

1. A low melting enamel frit comprising 31 to 39 weight percent of SiO$_2$, 13 to 21 weight percent of B$_2$O$_3$, 14 to 22 weight percent of Na$_2$O, 1 to 5 weight percent of K$_2$O, 13 to 20 weight percent of ZnO, 2 to 10 weight percent of F$_2$, and 2 to 9 weight percent of at least one intermediate oxide selected from the group consisting of Al$_2$O$_3$, TiO$_2$ and ZrO$_2$, each intermediate oxide not exceeding 5 weight percent, provided that the SiO$_2$/B$_2$O$_3$ ratio by weight is in the range of 1.5 to 3.0:1;

the total amount of ZnO, Al$_2$O$_3$, TiO$_2$ and ZrO$_2$ is in the range of 17 to 25 weight percent;

the $ZnO/(ZnO+Al_2O_3+TiO_2+ZrO_2)$ ratio by weight is in the range of 0.65 to 0.90:1;

the total amount of $Na_2O+K_2O$ is in the range of 16 to 23 weight percent;

the $(ZnO+Al_2O_3+TiO_2+ZrO_2)/(Na_2O+K_2O)$ ratio by weight is in the range of 0.85 to 1.2:1;

the $(SiO_2+B_2O_3+F_2)/(Na_2O+K_2O+ZnO)$ ratio by weight is in the range of 1.3 to 2.0:1;

said composition being substantially free from lead and phosphorous, said frit capable of being fired at temperatures lower than the $A_1$ transformation point of iron.

2. A low melting enamel frit according to claim 1, wherein ZnO is present in an amount of 14 to 18 wt%.

3. A low melting enamel frit according to claim 1, wherein the total amount of ZnO, $Al_2O_3$, $TiO_2$ and $ZrO_2$ is in the range of 18 to 23 wt%.

4. A low melting enamel frit according to claim 1, wherein the total amount of $Na_2O$ and $K_2O$ is in the range of 17 to 21 wt%.

5. A low melting enamel frit according to claim 1, wherein the $ZnO+Al_2O_3+TiO_2+ZrO_2/Na_2O+K_2O$ ratio by weight is in the range of 0.9 to 1.1:1.

6. A low melting enamel frit according to claim 1, further comprising at least one member selected from the group consisting of $MoO_3$, $V_2O_5$ and SnO in a total amount up to 3 wt%.

7. A low melting enamel frit according to claim 6, wherein said at least one member is present in an amount of 0.3 to 1 wt%.

8. A low melting enamel frit according to claim 1, further comprising up to 4 wt% of $Li_2O$.

9. A low melting enamel frit according to claim 1, further comprising up to 4 wt% of at least one member selected from the group consisting of CaO, MgO and BaO.

* * * * *